BISHOP & LOW.
Feed Trough.
No. 29,354.                                    Patented July 31, 1860.
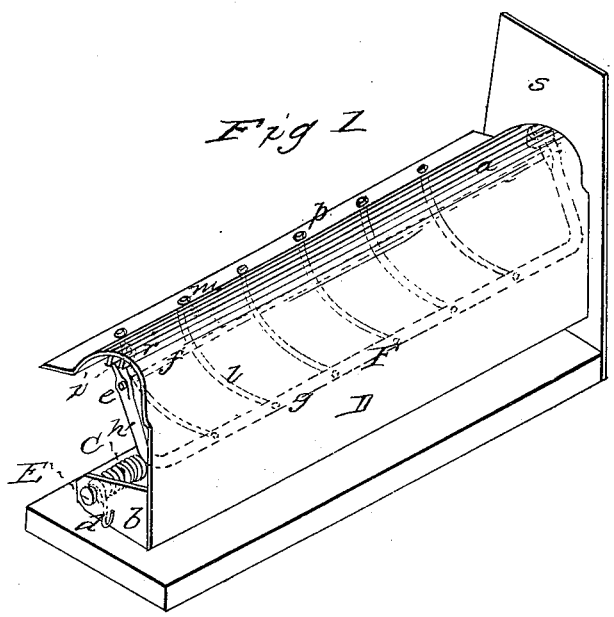
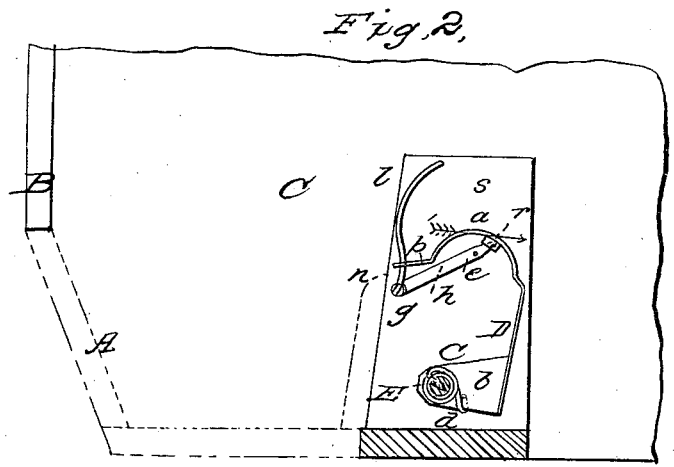

UNITED STATES PATENT OFFICE.

WILLIAM H. BISHOP AND AUGUSTUS H. LOW, OF WARREN, MASSACHUSETTS.

DEVICE TO PREVENT HORSES FROM CRIBBING.

Specification of Letters Patent No. 29,354, dated July 31, 1860.

*To all whom it may concern:*

Be it known that we, WILLIAM H. BISHOP and AUGUSTUS H. LOW, of Warren, in the county of Worcester and State of Massachusetts, have invented an Improved Attachment for Horse-Troughs and Mangers to Prevent Cribbing, of which the following is a full, clear, and exact description, reference being had to the accompanying drawings, making part of this specification, in which—

Figure 1, is a view of our improved attachment as applied to a horse trough. Fig. 2, a transverse vertical section through the same.

Many horses are addicted to the disagreeable and injurious habit of "cribbing." This they do by holding on with their teeth to the front of the feed trough or other place where they are tied, and drawing in or sucking wind with a peculiar noise. To prevent this the trough has been made of metal or of wood covered with metal, this prevents their biting and tearing the trough but not their "cribbing." A roller also has been placed on the edge of the trough which when turned will bring up a bar that strikes the horse on the nose, but with such a contrivance the horse can bite and even press forward on the roller, without turning in which event the striking bar will not come up, and this the horse quickly discovers, and avoids the blow. With our contrivance it is immaterial whether the horse turns the guard or not, for if touched or pressed on in any direction vertically, forward or backward, in a word, if the horse seize it at all it will throw up the striker, and hit him upon the nose.
Our invention therefore consists in combining a striking bar, or bars, with a guard of such construction, that when the horse attempts to seize said guard in his mouth, it will operate the striking bar or bars, and bring it against his nose, and thus compel him to let go, and prevent him from cribbing.

That others skilled in the art may understand and use our invention we will proceed to describe the manner in which we have carried out the same.

The feed trough A, (shown in red lines) is of the ordinary construction, the back at B, as well as the sides of the stall C, being boarded up so that there shall be no edge exposed on which the horse can fix his teeth. Immediately in front of the trough A is placed a metal guard D, which occupies the whole width between the sides C of the stall. The top of this guard is rounded at $a$. It has projecting from each end an arm $b$, which embraces and pivots on a stout metal rod or bar E, which is rigidly secured at each end in the sides C of the stall; or in a plate S, attached to the side C. A wire spring $c$ is coiled around the bar E at each end, one end of it is fastened to the bar and the other end is passed under the arm $b$, at D. This holds the guard D, up in the position shown in Fig. 1.

A metal frame F (shown dotted in Fig. 1,) is pivoted at $e$ on a rod $f$, extending from one side to the other of the stall beneath the top of the guard D; this frame consists of a stout rod $g$, bent up at each end to form an arm $h$, the end $i$ of which extends beyond the rod $f$, on which it is pivoted, and a series of rods or prongs $l$ curved as shown in the drawings, the ends of which enter corresponding holes $m$, in a flanch $p$ which projects from the curved top of the guard D, toward the trough A and slightly overlaps its front edge at $n$. A clutch $r$, attached to the under surface of the top of the guard D, at each end, embraces the end $i$ of the arm $h$.

The following is the operation of the above described mechanism: As soon as the horse seizes the rounded top $a$ of the guard D with his teeth (this is the only part exposed to his grasp) and pulls toward him in the direction indicated by the arrow Fig. 2, he vibrates the guard around the pivots E, against the resistance of the springs $c$. This causes the clutches $r$, to draw on the end $i$ of the arms $h$, and vibrate the frame F, into the position shown in Fig. 2, the rods $l$ projecting up through the holes $m$, and striking him on the nose; this makes him loose his hold of the guard D and will soon cure him of the habit of "cribbing." When released the parts are returned to the position shown in Fig. 1, by the springs $c$.

Instead of the points of the rods $l$, striking the horse, a bar or rod may connect their ends together or some other device may be operated by the movement of the guard D, but the arrangement shown is that which we prefer.

What we claim as our invention and desire to secure by Letters Patent is—

So combining the pivoted or hinged guard D, with the strikers $l$, through the arms $h$, and clutch $r$, as that any attempt to grasp the top of the guard will throw up the strikers, and give the horse a blow on the nose, and thus cause him to desist from any attempt at cribbing, as herein set forth and explained.

WM. H. BISHOP.
     AUGUSTUS H. LOW.

In presence of—
 DANIEL T. HITCHCOCK,
 N. RICHARDSON.